Figures 1, 2, 3:
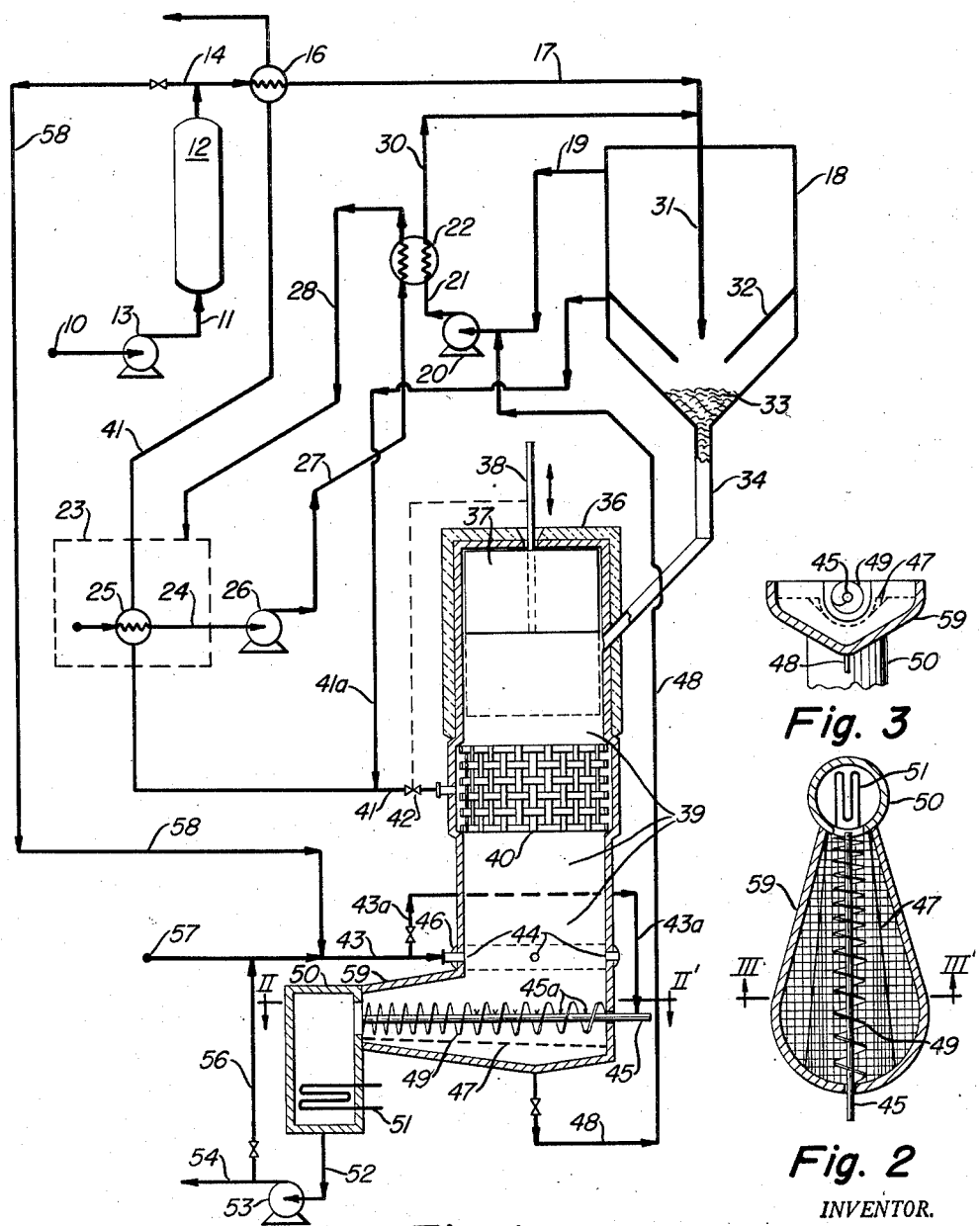

March 12, 1957    O. E. WILLIAMS    2,784,725

CRYSTAL-WASHER APPARATUS

Filed April 30, 1953

INVENTOR.
Olin E. Williams
BY
Donald E. Payne
ATTORNEY

United States Patent Office 2,784,725
Patented Mar. 12, 1957

2,784,725

CRYSTAL-WASHER APPARATUS

Olin E. Williams, Chicago, Ill., assignor to Standard Oil Company, Chicago, Ill., a corporation of Indiana Application April 30, 1953, Serial No. 352,248

5 Claims. (Cl. 134—115)

This invention relates to the separation and concentration of selected liquids from mixtures thereof and has more particular reference to the separation, by fractional crystallization and subsequent purification, of at least one component of a liquid mixture of miscible components such for example as a crude liquid mixture of xylene isomers.

Numerous methods and means have been proposed to exploit substantial differences in crystallization temperatures in the separation of compounds such as the xylene isomers which have boiling temperatures so close together that their separation by fractional distillation is impracticable. For example, para-xylene can be separated from coke-oven light oil or reformed petroleum naphtha by fractional crystallization. The recovery of such compounds by fractional crystallization does, however, introduce difficulties with respect to occlusion and adherence of mother liquor so that crystal purities greater than about 90 to 92% are difficult to obtain. Crystals of higher purity have been difficult to produce in any substantial volume because of the necessity for careful crystal washing, the resultant loss of a substantial portion of the crystals during the washing, and the absence of means whereby a commercially sizeable quantity of crystals can be economically treated.

A primary object of the present invention is to provide improved method and means for the separation and concentration of a single component from a crystallizable crude mixture. Another object of the invention is the provision of means for purifying a crystallized component that has been separated from a crude mixture of liquid components. The invention has for other objects such other advantages or results as will be found in the specifications and claims.

Briefly stated, the present invention comprises an improved means for effecting the separation and purification of a single crystallizable component from a mixture of liquid components. An elongated enclosed crystal-washer is provided, at one end of which is supplied means for introducing a crystal slurry, and pressing means for driving said crystal slurry through the crystal-washer. The crystal-washer contains an outlet for liquid expressed from the slurry by the said driving means that is situated between the ends of the separation zone and preferably slightly below the crystal-slurry inlet. The crystal-separator has a perforated end disposed opposite to the inlet end and situated so as to oppose the thrust of the slurry-pressing means whereby the plug of crystals that is formed by the pressing action of the driving means will be forced against the perforated end. Positive driving and mixing means are disposed in such relationship to the perforated end as to agitate the crystals and remove crystals from the surface thereof. A receiving vessel for the crystals that are so removed is provided. Means for introducing a wash liquid are disposed between the expressed-liquor outlet and the perforated end of the elongated separation zone whereby wash liquid can be forced into the crystal plug, be thoroughly admixed therein by the agitating and crystal removal means and be pressed through the perforated end to a collecting zone therebelow. The receiving vessel is preferably supplied with a heater in heat exchange relationship therewith so that crystals introduced into the vessel can be melted. The crystal melt so obtained can be pumped into the wash-liquor inlet to the separation zone. Means are also provided for introduction of an extraneously derived wash liquor or for the introduction of a portion of the feed as wash-liquor.

The apparatus can be provided with any of a number of known means for efficient fractional crystallization such as an Oslo-type crystallizer or a screw-fed tubular heat exchanger. Intermediate conventional means can also be employed to remove a portion of the mother liquor from the crystals before their introduction into the apparatus of the invention. However, the capacity of the present apparatus is remarkably high and consequently introduction of more conventional separating equipment between the crystallizer means and my crystal separator would constitute a bottleneck and the crystal washer is primarily suitable for the separation of pure crystals from the total crystal slurry from a crystallization process.

Of the attached drawings, which are supplied solely for the purpose of illustrating a preferred embodiment of the new invention, Fig. 1 is a diagrammatic cross section of a vertically disposed continuously operable crystal-washer for the concentration of a single component from a crude liquid mixture, Fig. 2 is a plan view of a section taken along lines II—II' of Fig. 1, and Fig. 3 is an elevational view section taken along lines III—III' of Fig. 2.

With special reference to Fig. 1, a typical example of operation of my apparatus is described in which a feed stock containing para-xylene is employed therein.

A crude xylenes hydroformer fraction containing by volume about 17% ortho-xylene, 33% meta-xylene, 12% para-xylene, 24% ethylbenzene, 10% paraffins and 2 to 3% toluene and $C_9$ aromatics, is fed from a source 10 through line 11 and is pumped into drier 12 by pump 13 disposed in the line 11. The feed stock is pumped through the drier 12 at a temperature of about 38° C. and at a rate, in this example, of about 3200 gallons per hour. Dried feed flows from the drier 12 through line 14 and heat exchanger 16 in which the feed is cooled by indirect contact with mother liquor to a temperature of about —50° C. Cooled fresh feed is flowed to the exchanger through line 17 into a continuous crystallizer 18. The contents of crystallizer 18 are withdrawn through line 19 by pump 20 and are passed by the pump 20 through line 21 into cooler 22 in which the recycle material is cooled to a temperature of about —100° C.

Cooling is effected by a liquid refrigerant which flows from a refrigeration system indicated at 23 through a line 24 in which is disposed a heat exchanger 25 wherein the liquid is cooled by mother liquor. The refrigerant liquid is then pumped from line 24 by pump 26, through line 27 into the cooler 22 in which the recycled xylenes mixture is cooled as before described. The refrigerant is introduced into the cooler 22 at a temperature of about —105° C. The cooling system has a capacity of about 300,000 B. t. u. per hour. Cooling liquid flows out of cooler 22 and returns by way of valved line 28 into the refrigeration system 23.

Cooled xylenes mixture flows from the cooler 22 through line 30 to the crystallizer 18, and is introduced therein, in admixture with fresh feed, by means of tube 31 which extends along the central vertical axis of the crystallizer to an intermediate point therein. The crystallizer can contain baffles 32 which slant downward from the walls to a central opening through which xylene crystals, settling on the baffles, are directed. The crystals accumulate in the lower baffled section 33 of the crystallizer 18. In a cylindrical crystallizer, baffles 32 can constitute a single inverted hollow truncated cone.

Crystal magma from crystallizer 18 will pass through line 34 at a rate of about 1500 gallons per hour into crystal washer 36 which consists of a vertically elongated enclosed cylinder. Within one end of the enclosed cylinder 36 is a piston 37 driven by a shaft 38 that is connected to reciprocating drive means (not shown). Piston 37 reciprocates within an upper section of the enclosed crystal washer 36. In its upward position it permits the introduction of crystal slurry from inlet line 34 into the crystallizer 18. As piston 37 is lowered it acts as a valve to close line 34. In the downward movement of the piston 37, it compresses the crystals to form a compressed mass or plug 39 of crystals which plug fills substantially entirely the lower section of the washer 36. At a point just below the extreme downward thrust of the piston 37, screened walls 40 are disposed in the periphery of the washer 36. Expressed liquor squeezed from the crystals by the compressive force of the downward movement of piston 37 flows through the screened walls 40 and mother-liquor outlet line 41 which contains a check valve 42 operative to close during the time that piston 37 is being withdrawn and to open when the piston 37 moves downwardly. Movement of the piston 37 closes the inlet 34 as it passes downward in compressing the crystal slurry.

Mother liquor is withdrawn from beneath the baffles 32 in crystallizer 18 through line 41a and is introduced therefrom into mother-liquor outlet line 41. Wash liquor is introduced through a line 43 to inlet sprays 44 that are disposed around the cylindrical washer 36 and are supplied by annular manifold 46 connecting said inlet tube 43 to the sprays 44. The plug of crystals 39 is washed by the wash liquor introduced through the sprays 44. The force of gravity and the pressing action of the piston 37 forces the crystals and wash liquor against a foraminate pan 47 of the crystal washer 36 and wash liquor flows through the perforations in the pan 47 and is withdrawn through valved line 48.

A screw feeder and agitator 49, driven by means not shown, is disposed in contact with the foraminate pan or screen 47 in a manner shown particularly in Figs. 2 and 3. The screen-pan 47 surrounds the lower half, cross-section-wise, of the screw 49 so that, in revolving, the screw will force crystals and wash liquor against the surface of the screen and cause the mother liquor to pass therethrough. The screw feeder and agitator 49 can be mounted on a hollow shaft 45 having spray-openings 45a in that part of the shaft that is directly beneath the crystal plug and is away from the outlet end of the screw feeder. Wash liquor can alternatively be flowed from line 43 through valved line 43a into the hollow shaft 45 and be sprayed into the crystal plug from the spray-openings 45a. This means of washing the crystals can be employed in substitution for or in conjunction with introduction of wash liquor through the sprays 44. In addition to effecting agitation and squeezing of the crystals on the screen 47, the screw feeder 49 transports the crystals from the crystal washer 36 into a crystal receiver 50 in which the crystals are melted by operation of a heater 51 in indirect heat exchange with the crystals.

The melted para-xylene flows from the receiver 50 through a line 52 in which is disposed pump 53. Pump 53 forces melted substantially pure para-xylene through line 54 to storage or utilization means. A portion of the melted xylene can be directed, instead, either continuously or intermittently through valved line 56 to its juncture with line 43 and can be employed as wash liquor in the lower section of the crystal washer 36. Extraneous wash liquor such, for example, as toluene, can be introduced from any source through line 57 into line 43 and can be employed also for washing crystals in the lower section of crystal washer 36. In addition a portion of feed stock can be flowed through valved line 58 to the sprays 44 and also be employed as a wash liquor. Each of these wash liquors can of course also be flowed through line 43a and into the plug at the feeder 49. Wash liquor from the base of the crystal washer 36 can be flowed through valved line 48 and be introduced through line 19 into the crystallizer 18 for recovery of its high content of para-xylene.

The crystal washer is preferably insulated especially above the screened section and will ordinarily operate at its upper end at a temperature well above the melting temperature of para-xylene and at its lower end near the melting point of para-xylene. The piston 37 can be, instead, a screw feeder, and, in the same manner, the screw feeder 49 can be a piston-like device. Preferably the screw feeder 49 is a helical screw having decreased pitch at its outlet end so that an increased compression of crystals is effected at that end in cooperation with, preferably, a tapered outlet 59 of the crystal washer 36 as shown more clearly in Fig. 2.

Para-xylene melt produced by my apparatus from a hydroformer fraction can be obtained in a purity as high as about 98% para-xylene and as such is suitable for direct employment for many purposes such as the synthesis of terephthalic acid. The apparatus has a throughput capacity equivalent to several times that of a substantially equivalent investment in centrifuges and it provides a para-xylene of higher purity.

Having described my invention, I claim:

1. In apparatus for the concentration of a single crystallizable component of a mixture of liquids comprising a crystallizer and means for removing crystal slurry therefrom and delivering it into a crystal washer, consisting of an elongated enclosed vessel connected at one end to the crystal-slurry delivery means, a crystal-slurry pressing means, which consists of a reciprocating piston, disposed within the end of the crystal washer to which is connected the said delivery means and operable to compress the crystal slurry and form a crystal plug within the said enclosed vessel, valve means whereby the slurry inlet means is closed during the compressing movement of the piston and is open during its retractive movement, a mother-liquid-outlet, valve means disposed at a point intermediate the length of the crystal washer and in close operational relationship with the said pressing means for release of expressed liquor from the crystal plug, means operative on said outlet valve means whereby the outlet is opened during compressive movement of the piston and closed during its retractive movement, inlet means for wash liquor located downstream of the said outlet means, a foraminate end closure disposed opposite the feed end of the elongated crystal washer and opposite also the crystal-slurry pressing means, an outlet disposed beneath the foraminate end closure for withdrawal of liquid passing through the end closure, and means for removing crystallizable component from the crystal washer.

2. The apparatus of claim 1 in which the wash-liquor inlet means is disposed in the walls of the crystal washer in annular relationship to the crystal plug below the said mother-liquid-outlet means and above the said means for removing crystallizable components from the surface of the pan.

3. In apparatus for the concentration of a single crystallizable component of a mixture of liquids comprising a crystallizer and means for removing crystal slurry therefrom and delivering it into a crystal washer, consisting of an elongated enclosed vessel connected at one end to the crystal-slurry delivery means, a crystal-slurry pressing means, which consists of a reciprocating piston, disposed within the end of the crystal washer to which is connected the said delivery means and operable to compress the crystal slurry and form a crystal plug within the said enclosed vessel, valve means whereby the slurry inlet means is closed during the compressing movement of the piston and is open during its retractive movement, a mother-liquid-outlet, valve means disposed at a point intermediate the length of the crystal washer and in close operational relationship with the said pressing means for release of expressed liquor from the crystal plug, means operative on said outlet valve means whereby the outlet is opened during compressive movement of the piston and closed during its retractive movement, inlet means for wash liquor located downstream of the said outlet means, a foraminate end closure disposed opposite the feed end of the elongated crystal washer and opposite also the crystal-slurry pressing means, an outlet disposed beneath the foraminate end closure for withdrawal of liquid passing through the end closure, means for removing crystallizable component from the crystal washer, a receiving vessel having a heater for receiving and melting crystals delivered from the crystal washer and means for returning melted crystals to the inlet means for wash liquor.

4. In means for the separation and purification of a crystallizable component of a solution of the same and at least one other component, a crystal-washer apparatus comprising an elongated enclosed vessel, inlet means for introduction into the vessel of a crystal slurry near one end of the said vessel, a reciprocably movable piston disposed in the inlet end of the vessel and operable to move along the longitudinal axis of the vessel and compress so- introduced slurry to a crystal plug, liquid outlet means for the escape of expressed liquid from the crystal plug disposed in the vessel walls below the said inlet means, a second inlet means for introduction of wash liquid disposed in the vessel walls below the said outlet means, a perforated pan effecting a screened closure of the said vessel at its end opposite to the said inlet end of the vessel against which pan the said crystal plug is pressed, and means for removing said crystallizable component from the surface of the pan consisting of a helical screw which is decreased in pitch toward its outlet end and in which the perforated pan surrounds, lengthwise, a portion of the screw and cooperates therewith to press crystals against the pan and effect removal of wash liquor through the pan.

5. The apparatus of claim 4 in which the said perforated pan and crystallizable-component outlet are tapered toward the outlet end of the helical screw so as to cooperate with the latter in expressing further quantities of wash liquid from the crystals.

References Cited in the file of this patent

UNITED STATES PATENTS

| | | |
|---|---|---|
| 675,179 | Wacker | May 28, 1901 |
| 1,109,728 | Wilson | Sept. 8, 1914 |
| 1,880,925 | Eissner | Oct. 4, 1932 |
| 2,221,806 | Loomis | Nov. 19, 1940 |
| 2,324,869 | Oman | July 20, 1943 |
| 2,598,449 | Scott et al. | May 27, 1952 |
| 2,617,274 | Schmidt | Nov. 11, 1952 |